US006907436B2

(12) United States Patent
Ye et al.

(10) Patent No.: US 6,907,436 B2
(45) Date of Patent: Jun. 14, 2005

(54) METHOD FOR CLASSIFYING DATA USING CLUSTERING AND CLASSIFICATION ALGORITHM SUPERVISED

(75) Inventors: Nong Ye, Phoenix, AZ (US); Xiangyang Li, Tempe, AZ (US)

(73) Assignee: Arizona Board of Regents, acting for and on behalf of Arizona State University, Tempe, AR (US)

( * ) Notice: Subject to any disclaimer, the term of this patent is extended or adjusted under 35 U.S.C. 154(b) by 410 days.

(21) Appl. No.: 10/014,744

(22) Filed: Oct. 26, 2001

(65) Prior Publication Data

US 2002/0161763 A1 Oct. 31, 2002

Related U.S. Application Data

(60) Provisional application No. 60/243,927, filed on Oct. 27, 2000.

(51) Int. Cl.[7] .............................................. G06F 17/30
(52) U.S. Cl. .......................................... 707/203; 707/3
(58) Field of Search .................... 707/1–10, 100–104.1, 707/200–205; 704/226; 382/149

(56) References Cited

U.S. PATENT DOCUMENTS 5,598,505 A * 1/1997 Austin et al. ............... 704/226
5,933,522 A * 8/1999 Sugimoto ................... 382/149
6,629,097 B1 * 9/2003 Keith ............................ 707/5

OTHER PUBLICATIONS

S. Garavaglia, "A heuristic self–organizing map trained using the tanimoto coefficient", May 4–9, 1998, PP 289–295.*

Sunil et al., "An optional algorithm for approximate nearest neighbor searchin" 1994, PP 573–582.*

* cited by examiner

Primary Examiner—Mohammad Ali
(74) Attorney, Agent, or Firm—Robert D. Atkins; Quarles & Brady Streich Lang LLP

(57) ABSTRACT

A method for classifying data involves receiving a set of training data from a physical process such as a computer network (20). The training data has attribute data and target data. The target data has a class label associated with the attribute data. Dummy clusters are derived from centroid coordinates of the training data associated with the class label (22). Distance measures are determined between the training data and a plurality of clusters which include the dummy clusters (24). Real clusters are created in the plurality of clusters if the training data is closest to a dummy cluster or a cluster having a class label different than the class label associated with the training data (26). A closest match between data to be classified and the plurality of clusters is identified (28) and the data is classified as the class label of the closest match from the plurality of clusters (30).

20 Claims, 3 Drawing Sheets

METHOD FOR CLASSIFYING DATA USING CLUSTERING AND CLASSIFICATION ALGORITHM SUPERVISED

CLAIM TO DOMESTIC PRIORITY

The present non-provisional patent application claims priority to provisional application Ser. No. 60/243,927, entitled "Novel Method and Algorithm for Classifying Data for Intrusion Detection and Other Data Mining Applications", filed on Oct. 27, 2000, by Nong Ye and Xiangyang Li.

STATEMENT REGARDING FEDERALLY SPONSORED RESEARCH

Financial assistance for this project has been provided by U.S. Government, Air Force Research Laboratory Grant Number P30602-99-1-0506 and Air Force Office of Scientific Research Grant Number F49620-99-1-0014; and the United States Government owns certain right to this invention.

FIELD OF THE INVENTION

The present invention relates in general to a method of classifying data points, and more particularly, to a method of incrementally learning classification patterns and using those patterns to classify data points.

BACKGROUND OF THE INVENTION

The general concept of classifying data points has been used in a myriad of contexts and applications. In a signature recognition application, a group of data points must be classified in order to identify a particular pattern. A signature recognition system using data classification techniques can identify a particular human face from a crowd, regulate the flow of inventory in a manufacturing system, or perform medical diagnosis from patient data. In computer technology, classification of data points can be used for intrusion detection and computer security. An intrusion can be defined as any set of activities aimed at breaking the security of a computer network system. Intrusions may take many forms: external attacks, internal misuses, network-based attacks, information gathering, denial of service, etc. Information security against intrusions mainly involves intrusion prevention, detection, diagnosis, response, and system recovery stages.

Intrusion detection is an essential part of protecting computer systems from internal or external attacks. It detects the intrusive activities when they occur in the system. Intrusion detection systems are in great demand with the rapid growth of computer networks, the World Wide Web, and the consolidation of corporate business/integrated teams on information technology ("IT") systems. The need for a reliable way to detect intrusion is compounded by the facts that security is still commonly an afterthought in systems design, that false-positive (false alarm) and false-negative (missed attack) rates remain high for certain intrusion types, and that attacks have become more complex, more significant in their impact and more difficult to defend against.

The main components of an intrusion detection system are the data collector, the analysis engine, and the system administrator involved in making final decisions. The core component is the analysis engine that is based on some intrusion detection algorithm. The intrusion detection algorithm collects incoming data points and compares them with the information and historical data from a computer system that comprise the patterns and profiles of normal activities and known intrusive activities. Then, based on these known patterns and profiles, the intrusion warning level of the current event is determined. The higher the intrusion warning level, the higher the possibility that the current activity of concern is from an intrusive scenario. Intrusion detection systems have been developed and implemented using various algorithms from a wide range of areas such as statistics, machine learning, and data mining.

An important criterion for evaluating an intrusion detection system is detection performance, which includes the false positive rate, detection probabilities and detection ranges for various intrusion types. Some other criteria are the speed of detection and granularity of data processing (e.g. real-time or batch-mode).

In general, each record of the intrusion detection data is a (p+1)-tuple with the attribute variable vector X in p dimensions and target variable $X_T$. Each attribute variable is numeric or nominal, and represents a certain attribute of the events occurring in the computer systems such as user identification (ID), time stamp, and service name. Target variable $X_T$ can be a binary variable with value 0 or 1, where 0 represents normal activity while 1 represents intrusive activity. Target variable $X_T$ can also be a multi-category nominal variable with such categories as NORMAL, SYNFLOOD, IPSWEEP, MAILBOMB, and so on. For training data, $X_T$ is known for each record and determined from historical data, i.e. where particular attribute variable has been found to be intrusive or non-intrusive to allow assignment of $X_T$. In detection or classification, $X_T$ is determined from the attribute variables, thus the attributes are also called predictor variables.

Existing intrusion detection systems focus on two kinds of activity data from an information system: network traffic data and computer audit data. Network traffic data contain records about data packets communicated between host machines, and capture activities over networks. The attributes of the network traffic data may include destination and source addresses, type of network service, outcome, possible error message, and others. Computer audit data records activities on individual host machines with attributes such as process ID, command type, and user ID. Regardless of the type of data used it may have nominal attributes such as event type, user ID, process ID, command type, remote IP address, and numeric variables such as the time stamp, central processing unit (CPU) load, and the service frequencies. Feature selection methods such as frequency counting are often applied to the raw data to produce the input for detection algorithms. Data from computer systems have features that intrusion detection algorithms must address.

For large volumes, intrusion detection systems generally have to process a very large volume of data from practical systems. The data from a computer or network can easily contain millions of records over a short period of time. In addition, the dimensions of each record can extend into the hundreds. Intrusion detection algorithms must be scalable and efficient in handling such data for those real-time systems.

For changing patterns, data increases tremendously with the rapid expansion of the computer networks and applications. The profiles of normal and intrusive activities change over time and new patterns appear constantly. Thus, a practical intrusion detection system has to adapt, modify and add new entries to its underlying model over time.

For complex attribute variables, various types of attribute variables including numerical, ordinal and nominal variables appear in data. Numeric variables such as the time stamp, intensity or frequency of certain services, are very common in intrusion detection input data, as well as nominal variables such as user ID, port ID or command name. The relationship among these attributes may be very complicated. Some attributes may be highly correlated with other attributes. In addition much noise exists in such data. The data results from not only intrusive activities, but also normal activities. The distribution model for normal and intrusive activities may be unclear. All these features of the data require robust intrusion detection algorithms capable of handling various types of variables.

In anomaly detection and signature recognition, there are two major types of intrusion detection approaches in practical use: anomaly detection, and signature recognition or pattern matching. Anomaly detection attempts to learn the normal behavior of a subject in a computer system and to build a profile for it. A subject may be a user, a host machine or a network. The activities are classified as attacks if they deviate significantly from the normal profile. The techniques used in anomaly detection include logic-based profiling, artificial neural networks, regression, computer immunology, Markov chains, Bayesian networks, hidden Markov models and statistics-based profiling.

A weakness of anomaly detection is that false positives are often given if the anomalies are caused by behavioral irregularities instead of intrusions. Signature recognition is better at handling irregularities but cannot detect novel intrusions. Hence, anomaly detection and signature recognition techniques are often used together to complement one another.

The signature recognition method attempts to recognize the signatures (patterns) of normal and intrusive activities that can be discovered from training data or human experience. Signature recognition algorithm types include string matching, state transition, Petri nets, rule-based systems, expert systems, decision trees, association rules, neural networks and genetic algorithms. The signatures are matched with incoming data to determine the nature of the activities, thus predicting detection by matching these patterns with new data. Signature recognition techniques include two types: programmed or manual systems and self-learning or automatic systems.

For programmed systems, the information related to the patterns and models of normal and intrusive activities in a computer system must be collected before being fed to the systems manually. By being presented training examples, self-learning systems learn to automatically deduce what constitutes normal and intrusive behaviors. These systems then distinguish the attacks from normal activities using this information.

As discussed above, intrusion detection systems generally process a very large volume of data from information systems. The profiles of normal and intrusive activities change over time and new patterns appear constantly. Thus, a practical intrusion detection system has to adapt, modify and add new entries to its underlying model over time. Moreover, such data includes a lot of noise. All these features make it difficult to manually program all the normal and intrusive patterns into a system.

Despite the popularity of the above systems, there are many weaknesses associated with the present systems. Specifically, genetic algorithms and neural networks are not scalable for large data sets due to their manipulation of large populations in the form of genes or neurons, and their high computation cost. Association rules analysis is good at handling nominal variables, but is incapable of handling numeric values. Scalability is a serious problem for association rules analysis if there are many different items in the data or the data contains many records. The Bayesian network used in eBayes TCP handles only nominal variables, needs a lot of prior knowledge of the system when it builds the model and the user configuration when it applies the batch-mode adaptation of the model, and has a high computation cost for modeling a complex system. Decision tree is a very popular data mining technique and a promising tool for intrusion detection application, but no decision tree has both abilities. Thus, incremental learning and scalability are issues for decision trees with regard to the computation and storage cost. Thus far, none of the known algorithms can fully meet these requirements.

SUMMARY OF THE INVENTION

In one embodiment, the present invention is a method for classification of data comprising providing first data from a physical process, the first data including a class label associated with attributes of the first data, deriving a dummy cluster from centroid coordinates of the first data associated with the class label, determining distance measures between the first data and a plurality of clusters which include the dummy cluster, creating a real cluster in the plurality of clusters if the first data is closest to the dummy cluster, identifying a closest match between second data and the plurality of clusters, and classifying the second data based on a class label of the closest match from the plurality of clusters.

In another embodiment, the present invention is a method of classifying first data from a physical process comprising providing first data which includes a class label associated with attributes of the first data, deriving a dummy cluster from centroid coordinates of the first data associated with the class label, determining distance measures between the first data and a plurality of clusters which include the dummy cluster, and creating a real cluster in the plurality of clusters if the first data is closest to a cluster having a class label different than the class label associated with the first data.

In another embodiment, the present invention is a method of classifying first data from a physical process comprising providing first data which includes a class label associated with attributes of the first data, deriving a dummy cluster from centroid coordinates of the first data associated with the class label, determining distance measures between the first data and a plurality of clusters which include the dummy cluster, and creating a real cluster in the plurality of clusters if the first data is closest to a dummy cluster.

In yet another embodiment, the present invention is a digital storage medium encoded with a computer program which classifies data. The computer program includes first instructions for providing first data from a physical process. The first data has a class label associated with attributes of the first data. Second instructions derive a dummy cluster from centroid coordinates of the first data associated with the class label. Third instructions determine distance measures between the first data and a plurality of clusters which include the dummy cluster. Fourth instructions create a real cluster in the plurality of clusters if the first data is closest to the dummy cluster.

DETAILED DESCRIPTION OF THE DRAWINGS

The present classification methodology involves incrementally learning patterns during a training stage and then using those patterns to classify data points during a classification stage. The methodology is typically implemented on a computer system as a computer program with a plurality of instructions to execute the training and classification process described herein. The computer program may be contained on and distributed via a digital storage medium such as a removable disk or compact disk (CDROM), or downloaded through a computer network.

In the training stage, attribute data and target data are processed and classified into clusters. In the classification stage, new attribute data is received and then classified in view of the clusters identified in the training stage. The process is called clustering and classification algorithm supervised (CCAS) in that the class information of data points is known and utilized in the training stage. Classification is normally called a supervised learning problem because the class information of data points is known and utilized in training stage.

Cluster analysis represents a family of different algorithms that group data points into clusters. Let S be a set of N points in a p-dimensional metric space. A partition of S into K sets $C_1, C_2, \ldots, C_k$ is called a K-clustering, and every $C_i$ is called a cluster. The distance between two points can be defined as an arbitrary function. A clustering problem is to look for a partition based on the distance measurements between data points and known clusters, with the aim to optimize a certain merit function.

Consider a set of data points, X, where each data point is a (p+1)-tuple in the form $\{X_1, X_2, \ldots, X_p | X_T\}$. The values $X_1, X_2, \ldots, X_p$ form the p-dimensions of the attribute or predictor variable of the data point, where $X_1$ is the first dimension value, $X_2$ is the second dimension value, and $X_p$ is the $p^{th}$ dimension value. The attribute variable may be a continuous variable, an ordinal variable, or a nominal variable, which represents certain attribute(s) of the events or information occurring in a physical system. The physical system may be a computer system, medical diagnosis equipment, or any other data processing system in which data must be classified, in one form or another.

Figure 1:
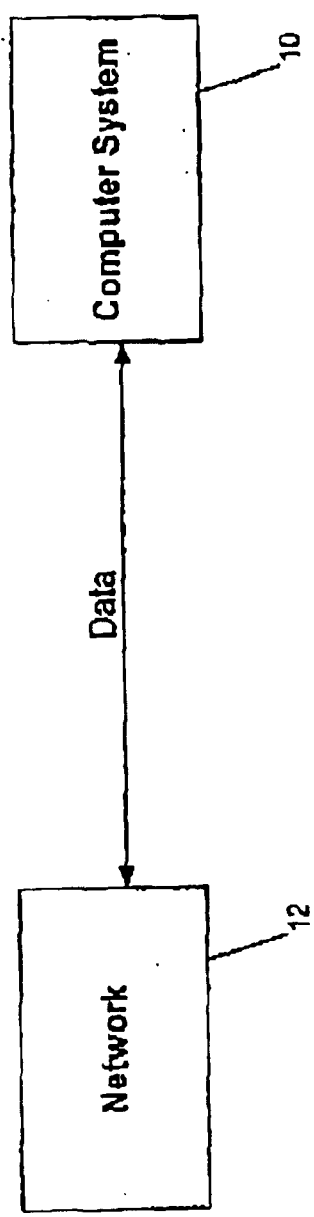
FIG. 1 is a block diagram illustrating a computer system sending and receiving data from a network.

For example, as shown in FIG. 1, computer system 10 sends and receives data to and from network 12. The incoming data, which defines the attribute variable, may be a user ID, time stamp, request, status, instruction, address, service name, or any other information used by the computer system. It is important to determine whether the incoming data from network 12 is potentially hazardous to the operation and security of computer system 10. Computer system 10 operates the CCAS classification methodology described herein. If computer system 10 determines that any sequence or string of incoming data is intrusive, e.g. an attempt to break through the firewall or otherwise invade the security and integrity of the computer system, then appropriate remedial measures can be taken. Thus, computer system 10 must monitor, evaluate, and classify the incoming data as intrusive or non-intrusive, or as a detection or non-detection of some event or status of interest.

The value $X_T$ is the target variable of the data point. There is a target variable $X_T$ for each data point. The target variable $X_T$ is an ordinal variable that is derived from and depends upon the attribute variables making up the data point. A particular value of attribute variable will have an associated target variable value. The value of the target variable associated with a particular value of attribute variable is determined by prior observation and knowledge. For example, a physical system may receive p-dimensional attribute variable as $X_1=1.0, X_2=1.5, \ldots, X_p=3.0$. By prior observation and knowledge, assume that it is known that receiving an attribute variable as $\{1.0, 1.5, \ldots, 3.0\}$ results in a non-intrusion or is a non-detection of a desired signature or pattern. A non-intrusive or non-detection event is assigned a target variable value, also called class label, of 0.0. Therefore, the attribute variable $\{1.0, 1.5, \ldots, 3.0\}$ has an associated target variable of 0.0 yielding the (p+1)-tuple data point as $\{1.0, 1.5, \ldots, 3.0|0.0\}$. The class label thus identifies or represents attributes of the data points.

Alternately, the physical system may receive p-dimensional attribute variable as $X_1=-1.0, X_2=1.5, \ldots, X_p=-3.0$. By prior observation and knowledge, assume that it is known that receiving an attribute variable as $\{-1.0, 1.5, \ldots, -3.0\}$ is an intrusive event or a detection of a desired signature or pattern. An intrusive or detection event is assigned a target variable value, or class label, of 1.0. Therefore, the attribute variable $\{-1.0, 1.5, \ldots, -3.0\}$ has an associated target variable value of 1.0 yielding the (p+1)-tuple data point as $\{-1.0, 1.5, \ldots, -3.0|1.0\}$.

The target variable $X_T$ identifies or labels the class or category of the data point. There are m classes or categories for the target variable $X_T$; where $m \geq 2$. The above example provides m=2 classes of target variable distinguished by two different numeric values, i.e. class label 0.0 and class label 1.0.

Training Stage

Figure 3:
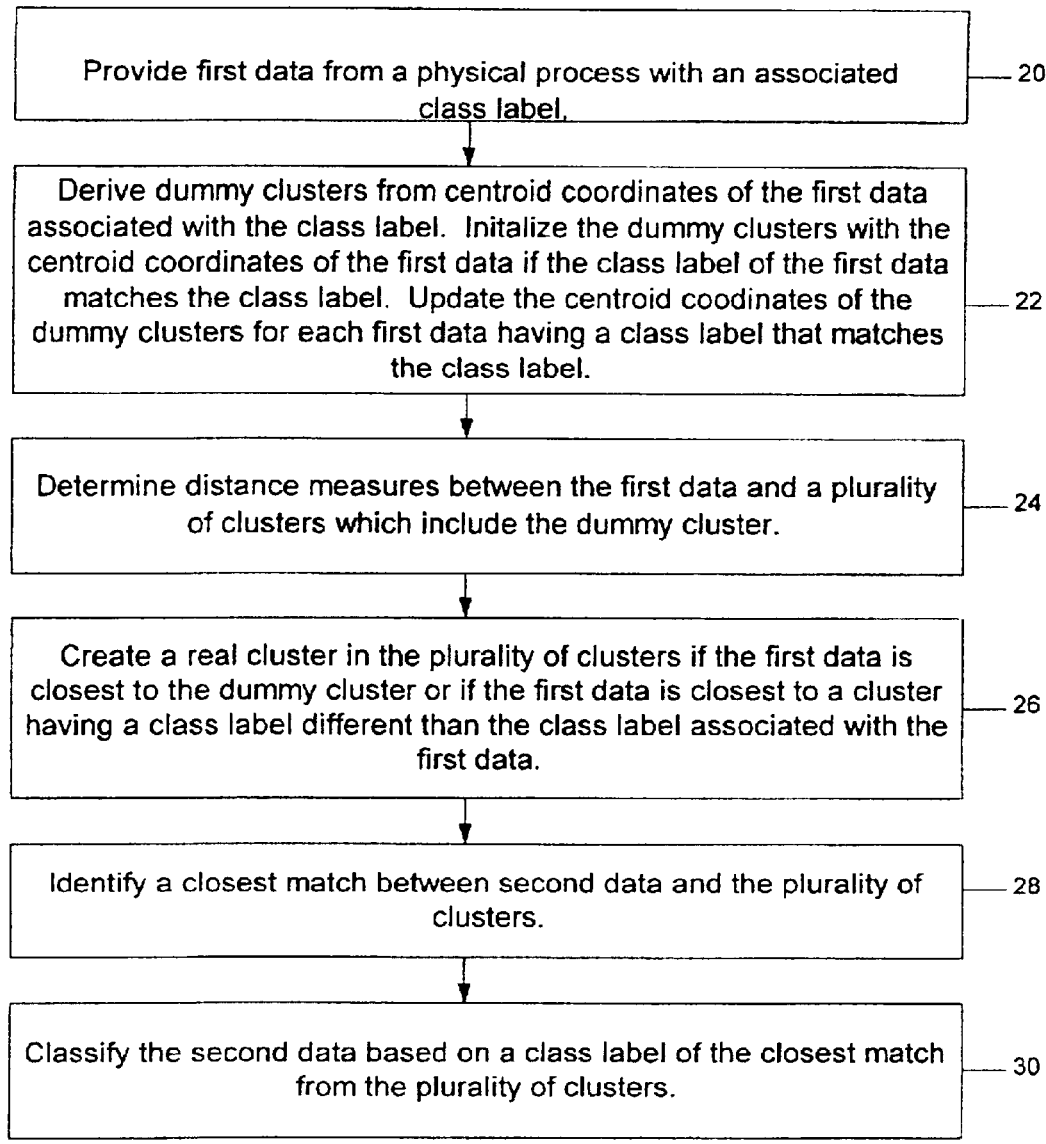
FIG. 3 is a dataflow diagram illustrating an embodiment of the training and classification methodology.

The training stage begins with step 20 of FIG. 3 which provides data points from a physical process with an associated class label. The data points representing attribute variables are obtained from a known source, such as computer data, network data, and medical diagnosis data. The attribute data may be a stream of data transmitted over a network to a computer, or received from a surveillance video camera, or generated from a medical diagnosis procedure. The data set $\{X_1, X_2, \ldots, X_p | X_T\}$ is known as the training data set or training data points. The purpose of the training stage is to group the attribute variables into one or more clusters. Thus, the result of the training stage is a plurality of clusters.

To assist in understanding the training and classification methodology, consider the simplified example given in Table 1 with p=2 (two-dimensional attribute data) and m=2 (two-value class labels: 0.0 and 1.0). Table 1 has N=6 data points, DP1–DP6, in the training data set, which are scanned in for training. By prior observation and knowledge, a set of six data points are given as:

TABLE 1

| Data point | $X_1$ | $X_2$ | $X_T$ |
|---|---|---|---|
| DP1 | 1.0 | 2.0 | 0.0 |
| DP2 | -1.0 | 1.5 | 1.0 |
| DP3 | -1.5 | 2.0 | 1.0 |
| DP4 | -2.0 | -1.5 | 0.0 |
| DP5 | -2.5 | -1.8 | 0.0 |
| DP6 | 3.2 | -2.7 | 1.0 |

DP1 has value $X_1=1.0$ and $X_2=2.0$. Again, by prior observation and knowledge, DP1 is known to be non-intrusive or a non-detection event and accordingly has a target variable value or class label of 0.0. DP2 has value $X_1=-1.0$ and $X_2=1.5$. DP2 is known to be intrusive or a detection event and accordingly has a target variable value or class label of 1.0. DP3 through DP6 likewise have target variable values or class labels as given.

Figure 2:
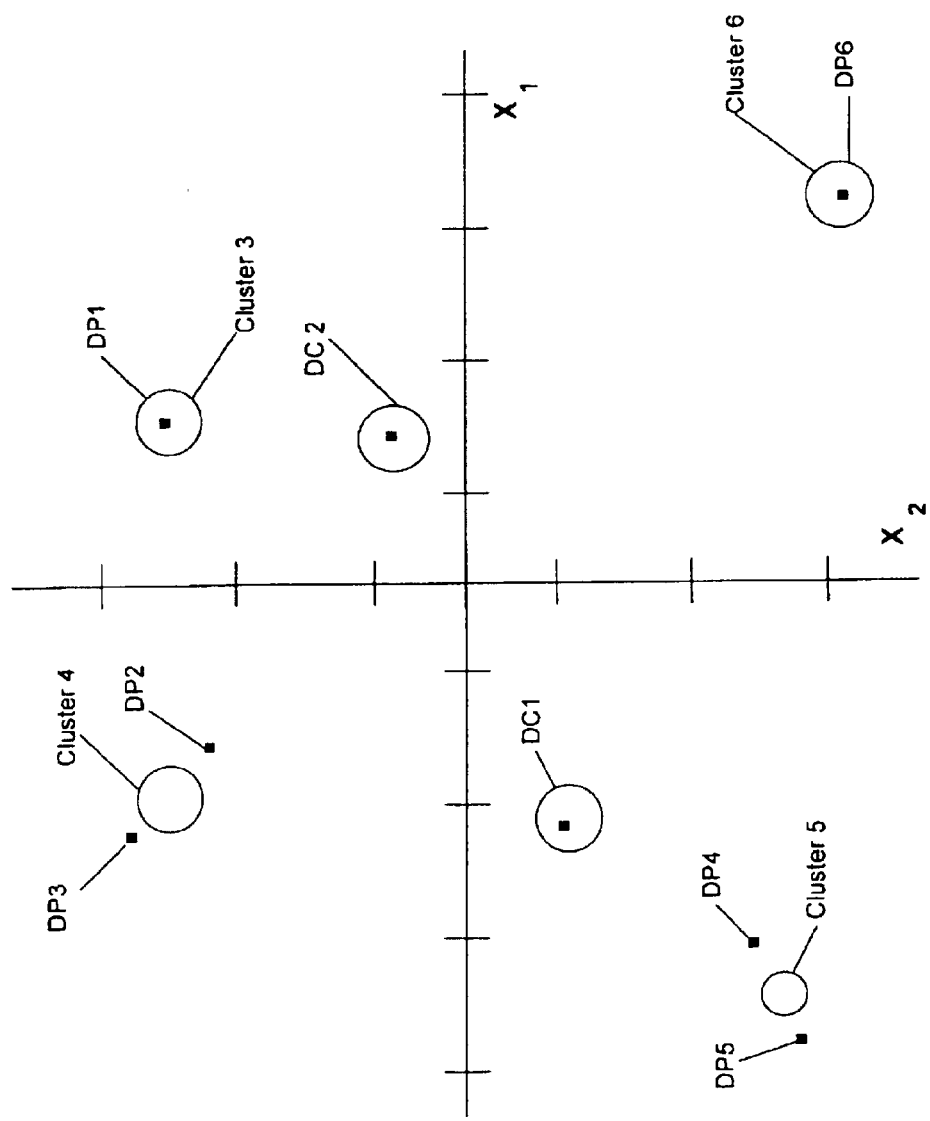
FIG. 2 is a plot of two-dimensional attribute variable data.

A plot of the attribute variables $X_1$ and $X_2$ is shown in FIG. 2. Data points DP1, DP4, and DP5 belong to class label 0.0, while data points DP2, DP3, and DP6 belong to class label 1.0.

For each attribute and target variable, the sample variance $S_{ii}$, of the attribute variable $X_i$, the sample variance $S_{TT}$ of the target variable $X_T$, and the sample covariance $S_{iT}$ of the attribute and target variables are initialized to zero, for $i=1, \ldots, p$. For each attribute and target variable, the sample mean $\overline{X_i}$ of the attribute variable $X_i$, and the sample mean $\overline{X_T}$ of the target variable $X_T$, are initialized to zero, for $i=1, \ldots, p$. The centroid coordinates for each class group $(X_{ij})$ are initialized to zero, for $i=1, \ldots, p$ and $j=c_1, \ldots, c_m$ and where j is a class label of target variable $X_T$.

In step 22 of FIG. 3, dummy clusters are derived from centroid coordinates of the data points associated with the class label. The dummy clusters are initialized with the centroid coordinates of the data points if the class label of the first data matches the class label. The centroid coordinates of the dummy clusters is updated for each data point having a class label that matches the class label. Dummy clusters are created from the training data set for the m class labels of the target variable $X_T$ by using the centroid coordinates of each target class group. The number of dummy clusters created is equal to the number of unique class labels. In the present example, two dummy clusters are created. The dummy cluster for the jth class label has the centroid whose coordinates are $(X_{1j}, \ldots, X_{pj})$, where $j=c_1, \ldots, c_m$. The class label $c_0$ is assigned to each dummy cluster, where $c_0$ is a different value from $c_1, \ldots, c_m$.

For $n=1, 2, \ldots, 6$, the nth data point in the training data set is used to update the sample variance $S_{11}$, sample variance $S_{TT}$, sample covariance $S_{iT}$, sample mean $\overline{X_1}$ and sample mean $\overline{X_T}$ using equation (1) through equation (5).

$$S_{ii}^2(n) = \frac{n-2}{n-1}S_{ii}^2(n-1) + \frac{1}{n}(X_i(n) - \overline{X_i}(n-1))^2 \quad (1)$$

$$S_{TT}^2(n) = \frac{n-2}{n-1}S_{TT}^2(n-1) + \frac{1}{n}(X_T(n) - \overline{X_T}(n-1))^2 \quad (2)$$

$$S_{iT}^2(n) = \frac{n-2}{n-1}S_{iT}^2(n-1) + \frac{1}{n}(X_i(n) - \overline{X_i}(n-1))(X_T(n) - \overline{X_T}(n-1)) \quad (3)$$

$$\overline{X_i}(n) = \frac{(n-1)\overline{X_i}(n-1) + x_i(n)}{n} \quad (4)$$

$$\overline{X_T}(n) = \frac{(n-1)\overline{X_T}(n-1) + X_T(n)}{n} \quad (5)$$

A dummy cluster is created for each target class, where the centroid coordinates $\{\overline{X_{1j}}, \overline{X_{2j}}, \ldots, \overline{X_{pj}}\}$ are calculated to be the mean vector of the attribute variables for that target class. The centroid coordinates can be calculated incrementally using equations (6) and (7) or non-incrementally using equation (8):

In equations (6) and (7), for $X_T(n)=c, c,j \in \{C1, \ldots Cm\}$, $j \neq c$:

$$\overline{X_{ic}}(n) = \frac{n_c \overline{X_{ic}}(n-1) + X_{ic}(n)}{n_c + 1} \text{ and } n_c = n_c + 1 \quad (6)$$

$$\overline{X_{ij}}(n) = \overline{X_{ij}}(n-1) \text{ and } n_j = n_j \quad (7)$$

$$\overline{X_{ij}} = \frac{\sum_{n=1}^{N_j} X_i(n)}{N_j} \quad j=0,1 \text{ and } i=1,\ldots,p \quad (8)$$

where $N_0$ is the number of the data points with the target variable of 0.0, $N_1$ is the number of the data points with the target variable of 1.0.

To distinguish the two dummy clusters from other clusters, the dummy clusters are assigned a target variable that is different from the target variables of the other clusters (i.e. dummy clusters are given target variable value of 2.0 as other clusters target variables are 0.0 and 1.0).

Given the first data point DP1 as $X_1=1.0$, $X_2=2.0$ and $X_T=0.0$, the sample variances and sample covariance between attribute variables and the target variable, the sample mean of the attribute and target variables, and centroid coordinates for the dummy clusters are calculated as follows:

$X(n=1)=\{X_1=1.0, X_2=2.0, X_T=0.0\}$ variance: $S_{11}^2(1)=0.0$, $S_{22}^2(1)=0.0$, $S_{TT}^2(1)=0.0$. from equations (1), (2)

covariance: $S_{1T}^2(1)=0.0$, $S_{2T}^2(1)=0.0$ from equation (3)

mean: $\overline{X_1}(1)=1.0$, $\overline{X_2}(1)=2.0$, $\overline{X_T}(1)=0.0$ from equations (4) and (5)

dummy cluster for class 0: $X_{10}(1)=1.0$, $X_{20}(1)=2.0$ dummy cluster for class 1: $X_{11}(1)=0$, $X_{21}(1)=0$ from equation (6)

The sample variances and sample covariance between attribute variables and the target variable, the sample mean of the attribute and target variables, and centroid coordinates for the dummy clusters for data points DP2 through DP6 are calculated as follows:

$X(n=2)=\{X_1=-1.0, X_2=1.5, X_T=1.0\}$ variance: $S_{11}^2(2)=2.0$, $S_{22}^2(2)=0.125$, $S_{TT}^2(2)=0.5$ covariance: $S_{1T}^2(2)=-1.0$, $S_{2T}^2(2)=-0.25$ mean: $\overline{X_1}(2)=0.0$, $\overline{X_2}(2)=1.75$, $\overline{X_T}(2)=0.5$ dummy cluster for class 0: $X_{10}(2)=1.0$, $X_{20}(2)=2.0$ dummy cluster for class 1: $X_{11}(2)=-1.0$, $X_{21}(2)=1.5$ $X(n=3)=\{X_1=-1.5, X_2=2.0, X_T=1.0\}$ variance: $S_{11}^2(3)=1.75$, $S_{22}^2(3)=0.083$, $S_{TT}^2(3)=0.33$ covariance: $S_{1T}^2(3)=-0.75$, $S_{2T}^2(3)=-0.083$ mean: $\overline{X_1}(3)=-\rho 0.5$, $\overline{X_2}(3)=1.83$, $\overline{X_T}(3)=0.67$ dummy cluster for class 0: $X_{10}(3)=1.0$, $X_{20}(3)=2.0$ dummy cluster for class 1: $X_{11}(3)=-1.25$, $X_{21}(3)=1.75$ $X(n=4)=\{X_1=-2.0, X_2=-1.5, X_T=0.0\}$ variance: $S_{11}^2(4)=1.73$, $S_{22}^2(4)=2.83$, $S_{TT}^2(4)=\mathbf{0.33}$ covariance: $S_{1T}^2(4)=-0.25$, $S_{2T}^2(4)=0.5$ mean: $\overline{X_1}(4)=-0.875$, $\overline{X_2}(4)=1.0$, $\overline{X_T}(4)=0.5$ dummy cluster for class 0: $X_{10}(4)=-0.5$, $X_{20}(4)=0.25$ dummy cluster for class 1: $X_{11}(4)=-1.25$, $X_{21}(4)=1.75$ $X(n=5)=\{X_1=-2.5, X_2=-1.8, X_T=0.0\}$ variance: $S_{11}^2(5)=1.825$, $S_{22}^2(5)=3.69$, $S_{TT}^2(5)=0.3$ covariance: $S_{1T}^2(5)=-0.025$, $S_{2T}^2(5)=0.66$ mean: $\overline{X_1}(5)=-1.2$, $\overline{X_2}(5)=0.44$, $\overline{X_T}(5)=0.4$ dummy cluster for class 0: $X_{10}(5)=-1.17$, $X_{20}(5)=-0.43$ dummy cluster for class 1: $X_{11}(5)=-1.25$, $X_{21}(5)=1.75$ X(n=6)={$X_1$=3.2, $X_2$=−2.7, $X_T$=1.0}
variance: $S_{11}^2$(6)=4.68, $S_{22}^2$(6)=4.60, $S_{TT}^2$(6)=0.3
covariance: $S_{1T}^2$(6)=0.42, $S_{2T}^2$(6)=0.21
mean: $\overline{X_1}$(6)=−0.47, $\overline{X_2}$(6)=−0.083, $\overline{X_T}$(6)=0.5
dummy cluster for class 0: $X_{10}$(6)=−1.17, $X_{20}$(6)=−0.43
dummy cluster for class 1: $X_{11}$(6)=0.7, $X_{21}$(6)=0.27

The final centroid coordinates are for dummy cluster 1, with a class label given as 2.0 (different than class labels of attribute variables), is determined to be {−1.17, −0.43|2.0}. The final centroid coordinates are for dummy cluster 2, with the same class label given as 2.0, is determined to be {0.7, 0.27|2.0}. A plot of the dummy cluster 1 (DC1) and dummy cluster 2 (DC2) is shown in FIG. 2.

Once the sample variance, sample covariance and sample mean are calculated, the results are then used to calculate the squared correlation coefficient for each attribute variable $X_i$ and the target variable $X_T$, for use in later equations. The squared correlation coefficient for each attribute variable is determined by equation (9) or equation (10) as follows:

$$r_{iT}^2 = \left( \frac{\sum_{n=1}^{N}(X_i(n) - \overline{X_i})(X_T(n) - \overline{X_T})}{\sqrt{\sum_{n=1}^{N}(X_i(n) - \overline{X_i})^2 \sum_{n=1}^{N}(X_T(n) - \overline{X_T})^2}} \right)^2 \quad (9)$$

$$r_{iT}^2(N) = \left( \frac{S_{iT}(N)}{\sqrt{S_{ii}(N)}\sqrt{S_{iT}(N)}} \right)^2 \quad (10)$$

Equation (9) is used for non-incremental calculation of the correlation coefficient, while equation (10) is used for incremental calculation of the correlation coefficient. In the present example, equation (10) is used to incrementally calculate the squared correlation coefficient for N=6 as $r_{1T}^2$(6)=0.13, $r_{2T}^2$(6)=0.032.

In step 24 of FIG. 3, distance measures are determined between the first data and a plurality of clusters which include the dummy cluster. For the data points X defined in Table 1, the nearest cluster L to each data point is determined using the distance measure, d(X,L), weighted by the squared correlation coefficient of each predictor variable. A cluster L is a summarization of the data points in it, and is represented by the centroid of all the data points in it, with coordinates XL, the number of data points, $N_L$, and the clasp label, $XL_T$. The distance measure can be calculated by equation (11) using a weighted Canberra distance, or by equation (12) using a weighted Euclidean distance, or by equation (13) using a weighted Chi-squared distance.

$$d(X, L) = \sum_{i=1}^{P} \frac{|X_i - XL_i|}{X_i + XL_i} r_{iT}^2 \quad (11)$$

$$d(X, L) = \sqrt{\sum_{i=1}^{P}(X_i - XL_i)^2 r_{iT}^2} \quad (12)$$

$$d(X, L) = \sum_{i=1}^{P} \frac{(X_i - XL_i)^2}{XL_i} r_{iT}^2 \quad (13)$$

In step 26 of FIG. 3, a real cluster in the plurality of clusters is created if the first data is closest to the dummy cluster or if the data point is closest to a cluster having a class label different than the class label associated with the data point. For the present example, the weighted Euclidean distance given in equation (12) is selected. The data points in Table 1 are applied via equation (12) to determine distances between each data point and the known clusters L. At first there are two known clusters in the plurality of clusters: dummy cluster DC1 and dummy cluster DC2. After performing the distance measures of equation (12), it can be determined which one of the known clusters L is closest to a given data point. If the closest cluster L is a dummy cluster, or if the closest cluster L does not have the same target class label as that of the data point, then a new cluster is created in the plurality of clusters with this data point as the centroid. The number of the data points in the new cluster is one, and the class label of the new cluster is the target class of the data point. If the closest cluster L is not a dummy cluster and has the same target class label as that of the data point, the data point is combined into the closest cluster L, and the centroid coordinates of cluster L and the number of the data points ($N_L$) in the cluster is updated as per equations (14) and (15).

$$XL = \frac{N_L XL + X}{N_L + 1} \quad (14)$$

$$N_L = N_L + 1 \quad (15)$$

The data points in Table 1 are processed through equation (12) as follows:

X(n=1)={$X_1$=1.0, $X_2$=2.0, $X_T$=0.0}
d(X(n=1), Cluster 1)=0.88 from equation (12)
d(X(n=1), Cluster 2)=0.33 from equation (12)
X(n=1) is closest to Cluster 2; create new cluster 3 now there are 3 clusters:
Cluster 1: (−1.17, −0.43|2.0)
Cluster 2: (0.7, 0.27|2.0)
Cluster 3: (1.0, 2.0|0.0)
X(n=2)={$X_1$=−1.0, $X_2$=1.5, $X_T$=1.0}
d(X(n=2), Cluster 1)=0.35
d(X(n=2), Cluster 2)=0.64
d(X(n=2), Cluster 3)=0.71
X(n=2) is closest to Cluster 1; create new cluster 4
Cluster 1: (−1.17, −0.43|2.0)
Cluster 2: (0.7, 0.27|2.0)
Cluster 3: (1.0, 2.0|0.0)
Cluster 4: (−1.0, 1.5|1.0)
X(n=3)={$X_1$=−1.5, $X_2$=2.0, $X_T$=1.0}
d(X(n=3), Cluster 1)=0.45
d(X(n=3), Cluster 2)=0.84
d(X(n=3), Cluster 3)=0.89
d(X(n=3), Cluster 4)=0.20
X(n=3) is closest to Cluster 4; update Cluster 4
Cluster 1: (−1.17, −0.43|2.0)
Cluster 2: (0.7, 0.27|2.0)
Cluster 3: (1.0, 2.0|0.0)
Cluster 4: (−1.25, 1.75|1.0)
X(n=4)={$X_1$=−2.0, $X_2$=−1.5, $X_T$=0.0}
d(X(n=4), Cluster 1)=0.35
d(X(n=4), Cluster 2)=1.01
d(X(n=4), Cluster 3)=1.23
d(X(n=4), Cluster 4)=0.64
X(n=4) is closest to Cluster 1; create new Cluster 5
Cluster 1: (−1.17, −0.43|2.0)
Cluster 2: (0.7, 0.27|2.0)
Cluster 3: (1.0, 2.0|0.0)

Cluster 4: (−1.25, 1.75|1.0)
Cluster 5: (−2.0, −1.5|0.0)
X(n=5)={X$_1$=−2.5, X$_2$=−1.8, X$_T$=0.0}
d(X(n=5), Cluster 1)=0.53
d(X(n=5), Cluster 2)=1.19
d(X(n=5), Cluster 3)=1.41
d(X(n=5), Cluster 4)=0.77
d(X(n=5), Cluster 5)=0.19
X(n=5) is closest to Cluster 5; update Cluster 5
Cluster 1: (−1.17, −0.43|2.0)
Cluster 2: (0.7, 0.27|2.0)
Cluster 3: (1.0, 2.0|0.0)
Cluster 4: (−1.25, 1.75|1.0)
Cluster 5: (−2.25, −1.65|0.0)
X(n=6)={X$_1$=3.2, X$_2$=−2.7, X$_T$=1.0}
d(X(n=6), Cluster 1)=1.6
d(X(n=6), Cluster 2)=1.03
d(X(n=6), Cluster 3)=1.15
d(X(n=6), Cluster 4)=1.77
d(X(n=6), Cluster 5)=1.94
X(n=6) is closest to Cluster 2; create new Cluster 6
Cluster 1: (−1.17, −0.43|2.0)
Cluster 2: (0.7, 0.27|2.0)
Cluster 3: (1.0, 2.0|0.0)
Cluster 4: (−1.25, 1.75|1.0)
Cluster 5: (−2.25, −1.65|0.0)
Cluster 6: (3.2, −2.7|1.0)

The final or real clusters from the training stage are Cluster 3 as (1.0, 2.0|0.0); Cluster 4 as (−1.25, 1.75|1.0); Cluster 5 as (−2.25, −1.65|0.0); Cluster 6 as (3.2, −2.7|1.0), which are also shown in FIG. 2. The use of the dummy clusters, as defined in the training stage, have separated and split the number of real clusters (Clusters 3, 4, 5 and 6) which will be used in the classification stage to minimize classification errors. The CCAS methodology performs a supervised clustering procedure based on the distance information as well as the target class information of the data points in the training data set.

The present CCAS methodology provides a simple and straight forward mechanism to represent the clusters by use of centroids. Since this clustering uses a heuristic considering only the local area when incorporating a training data point, the present example of training is scalable to larger data sets and practical classification problems. Not all the cluster structure and data points are needed in the clustering progress. The CCAS supports the incremental update of the clusters with new training data. The parameters from the previous training phase, including the correlation coefficient for each prediction variable, the centroid coordinates of each cluster, and the number of the data points in each cluster are kept all the time. Thus, they can be updated incrementally with each of the new training data by repeating the steps in training.

Classification Stage

Returning to the example shown in FIG. 1, computer system 10 receives data from network 12. Computer system 10 operates with the CCAS classification methodology to check the incoming data for intrusive content. Assume computer system 10 receives a sequence or string of new data (ND). The question becomes whether the new data sequence is intrusive or non-intrusive to the operation, integrity, and security of computer system 10.

Again using a simplified example, assume the data sequence is a first new data point ND(1)=ND$_1$=1.5, ND$_2$=2.5. The new data point is assigned to have the same class value as the closest cluster. The distance measure from the training stage is used again to determine the distance between the new data point and each real cluster as follows:
ND(1)={ND$_1$=1.5, ND$_2$=2.5}
d(ND(1), Cluster 3)=0.20 from equation (12)
d(ND(1), Cluster 4)=0.98 from equation (12)
d(ND(1), Cluster 5)=1.52 from equation (12)
d(ND(1), Cluster 6)=1.11 from equation (12)

In step 28 of FIG. 3, a closest match is identified between second data and the plurality of clusters. In step 30, the second data is classified based on a class label of the closest match from the plurality of clusters. The new data point ND(1) is closest to Cluster 3, which has class label 0.0. The new data point ND(1) is classified as having the same class label as the cluster to which it is the closest. In this case, Cluster 3 has a class label of 0.0, which is a non-intrusive or non-detection event. Therefore, new data point ND(1) is classified as non-intrusive to computer system 10.

Assume a second new data point ND(2)=ND$_1$=−2.0, ND$_2$=3.5. The distance measure is calculated as follows:
ND(2)={ND$_1$=−2.0, ND$_2$=3.5}
d(ND(2), Cluster 3)=1.10
d(ND(2), Cluster 4)=0.41
d(ND(2), Cluster 5)=0.93
d(ND(2), Cluster 6)=2.15

ND(2) is closest to Cluster 4, which has class label 1.0. The new data point ND(2) is classified as having the same class label as the cluster to which it is the closest. In this case, Cluster 4 has a class label of 1.0, which is intrusive or a detection event. Therefore, new data point ND(2) is classified as intrusive to computer system 10.

As an alternate embodiment, the new data point may be assigned the class that is dominant in the k-nearest clusters. If, for example k=3, then new data point is assigned the target variable or class that is dominant of the 3 closest clusters. The dominant class may be an average, mean, or simply the most frequent value, in which case k should be selected as an odd number to break any tie. If ND(1) is closest to Cluster 3, Cluster 4, and Cluster 5, then ND(1) is assigned the dominant class for these clusters, which is class label 0.0. ND(1) is therefore non-intrusive to computer system 10. If ND(2) is closest to Cluster 4, Cluster 5, and Cluster 6, then ND(2) is assigned the dominant class for these clusters, which is class label 1.0. ND(2) is therefore intrusive to computer system 10.

In practice, there are several variations that may be applied to increase robustness, scalability and incremental learning. For example, the new data point may be assigned the class or target variable from a distance-weighted average of the k-nearest clusters.

$$W^j = \frac{1}{d^2(ND, L^j)} \quad (16)$$

$$X_T = \frac{\sum_{j=1}^{k} XL_T^j \cdot W^j}{\sum_{j=1}^{k} W^j} \quad (17)$$

where $L^j$ is the centroid coordinates of the jth nearest cluster, $W^j$ is the weight of the cluster $L^j$ based on the distance from ND to the centroid of this cluster; the target class of this cluster is $XL_T^j$, and the target class of the new data point ND is $X_T$. The class value $X_T$ of the new data point falls in the range of [0,1] to describe its closeness to the two target classes of 0.0 and 1.0 as presented in the k nearest clusters of the new data point. Using one or more thresholds as the decision maker, if the new data point exceeds the threshold as being closer to class 0.0, then the new data point is classified as non-intrusive. If the new data point exceeds the threshold as being closer to class 1.0, then the new data point is classified as intrusive.

As another variation, after applying the distance measure of equation (11), (12) or (13), the cluster that results can be weighted by number of data points in the cluster $N_L$. Thus, the cluster that contains more data points can be regarded as having more weight in the classification of the data point. To do so, the number of data points in the cluster is used to measure the density of the cluster. The following equation is used to assign cluster weight:

$$w^j = \frac{N_L^j}{d^2(ND, L^j)} \quad (18)$$

Incremental training can be used when new data points are dynamically added to the training data set over time. Let Q be the number of data points in the initial training data set and let q be the number of data pints in a data block that is added to the training data set at a given time, where $q \geq 1$, and Q normally is a larger number than q. Incremental training may be practiced by running all the steps of the training phase with N=Q. The cluster structure can then be used to classify data points by running the classification phase. When a new data block of size q becomes available, the data points in this new data block are used in equations (1)–(7) and (10) to update the training parameters and repeat the supervised clustering steps. The resulting cluster structure can then be used to classify data points by running the classification phase. Repeat the steps for any new data block that is added to the training data set.

In addition, the number of clusters that are generated can be controlled. The following methods of controlling the number of clusters may be used individually or in combination with one another. The user specifies a threshold on the number of clusters for a certain class label. The threshold is used to control the number of clusters generated for that class label from the training phase. During training, the dummy cluster for that class label is removed after the number of clusters with that class label reaches a given threshold. The removal of the dummy cluster for that class label can slow down the increase in the number of clusters for that class label. The user may specify thresholds for more than one class label.

A second method allows the user to specify a threshold on the number of data points for a certain class label. The threshold number of data points can be used to control the number of clusters produced for that class label from training. Let q denote this threshold number of data points. The training data set of size N is divided into two parts: i) the first part includes the first q data points falling in that class label and all data points for other class labels without a given threshold, and ii) the second part has only one class label. Let Q denote the number of data points in the first part. Applying the steps of the training phase and using the first part of the training data set containing Q data points to obtain clusters, for each of the (N–Q) data points, X, in the second part of the training data set, group the data point, X, into the cluster structure from the previous training phase result creating new clusters.

While the invention has been described with reference to preferred embodiments, it will be understood by those skilled in the art that various changes may be made and equivalents may be substituted for elements thereof without departing from the scope of the invention. Therefore, it is intended that the invention not be limited to particular embodiments disclosed as the best mode contemplated for carrying out this invention, but that the invention will include all embodiments falling within the scope of the appended claims.

What is claimed is:

1. A computer-implemented method for classification of data, comprising:

providing first data from a physical process, the first data including a class label associated with attributes of the first data;

deriving a temporary artificial cluster from centroid coordinates of the first data associated with the class label, wherein the temporary artificial cluster has a class-label different than the class label associated with the attributes of the first data;

determining distance measures between the first data and a plurality of clusters which include the temporary artificial cluster;

creating a real cluster in the plurality of clusters if the first data is closest to the temporary artificial cluster;

identifying a closest match between second data and the plurality of clusters; and classifying the second data based on a class label of the closest match from the plurality of clusters.

2. A computer-implemented method for classification of data, comprising:

providing first data from a physical process, the first data including a class label associated with attributes of the first data;

deriving a dummy cluster from centroid coordinates of the first data associated with the class label, wherein deriving the dummy cluster includes, (a) creating first and second dummy clusters associated with first and second class labels, respectively, (b) initializing the first dummy cluster with the centroid coordinates of the first data if the class label of the first data matches the first class label, and (c) initializing the second dummy cluster with the centroid coordinates of the first data if the class label of the first data matches the second class label;

determining distance measures between the first data and a plurality of clusters which include the dummy cluster;

creating a real cluster in the plurality of clusters if the first data is closest to the dummy cluster;

identifying a closest match between second data and the plurality of clusters;

classifying the second data based on a class label of the closest match from the plurality of clusters;

wherein deriving a dummy cluster includes updating the centroid coordinates of the first dummy cluster for each first data having a class label that matches the first class label; and updating the centroid coordinates of the second dummy cluster for each first data having a class label that matches the second class label.

3. The method of claim 2, wherein determining distance measures between the first data and a plurality of clusters includes using one of the group of a weighted Canberra distance, a weighted Euclidean distance, and a weighted Chi-squared distance for the distance measure.

4. The method of claim 2, wherein determining distance measures between the first data and a plurality of clusters includes:
    calculating sample variance of the first data;
    calculating sample covariance of the first data;
    calculating sample mean of the first data; and
    calculating correlation coefficient from the sample variance, sample covariance, and sample mean of the first data.

5. The method of claim 2, further including creating a real cluster in the plurality of clusters if the first data is closest to a cluster having a class label different than the class label associated with the first data.

6. The method of claim 2, wherein identifying a closest match between second data and the plurality of clusters includes calculating a distance measure from one of the group of a weighted Canberra distance, a weighted Euclidean distance, and a weighted Chi-squared distance and using the closest distance measure as the closest match.

7. A computer-implemented method of classifying first data from a physical process, comprising:
    providing first data which includes a class label associated with attributes of the first data;
    deriving an artificial cluster from centroid coordinates of the first data associated with the class label, wherein the artificial cluster has a class label different than the class label associated with the attributes of the first data to cause the first data to separate from the artificial cluster during the classification process;
    determining distance measures between the first data and a plurality of clusters which include the artificial cluster;
    creating a real cluster in the plurality of cluster if the first data is closest to the artificial cluster;
    identifying a closest match between second data and the plurality of clusters; and
    classifying the second data based on a class label of the closest match from the plurality of clusters.

8. The method of claim 7, wherein identifying a closest match between second data and the plurality of clusters includes calculating a distance measure from one of the group of a weighted Canberra distance, a weighted Euclidean distance, and a weighted Chi-squared distance and using tile closest distance measure as the closest match.

9. The method of claim 7, wherein deriving the artificial cluster includes:
    creating first and second artificial clusters associated with first and second class labels, respectively;
    initializing the first artificial cluster with the centroid coordinates of the first data if the class label of the first data matches the first class label; and
    initializing the second artificial cluster with the centroid coordinates of the first data if the class label of the first data matches the second class label.

10. The method of claim 9, wherein deriving the artificial cluster further includes:
    updating the centroid coordinates of the first artificial cluster for each first data having a class label that matches the first class label; and
    updating the centroid coordinates of the second artificial cluster for each first data having a class label that matches the second class label.

11. The method of claim 7, further including creating a real cluster in the plurality of clusters if the first data is closest to a cluster having a class label different than the class label associated with the first data.

12. A computer-implemented method of classifying first data from a physical process, comprising:
    providing first data which includes a class label associated with attributes of the first data;
    deriving a dummy cluster from centroid coordinates of the first data associated with the class label, wherein the dummy cluster has a class label different than the class label associated with the attributes of the first data;
    determining distance measures between the first data and a plurality of clusters which include the dummy cluster;
    creating a real cluster in the plurality of clusters if the first data is closest to a cluster having a class label different than the class label associated with the first data;
    identifying a closest match between second data and the plurality of clusters; and
    classifying the second data based on a class label of the closest match from the plurality of clusters.

13. The method of claim 12, wherein identifying a closest match between second data and the plurality of clusters includes calculating a distance measure from one of the group of a weighted Canberra distance, a weighted Euclidean distance, and a weighted Chi-squared distance and using the closest distance measure as the closest match.

14. The method of claim 12, wherein deriving a dummy cluster includes:
    creating first and second dummy clusters associated with first and second class labels, respectively;
    initializing the first dummy cluster with the centroid coordinates of the first data if the class label of the first data matches the first class label; and
    initializing the second dummy cluster with the centroid coordinates of the first data if the class label of the first data matches the second class label.

15. The method of claim 14, wherein deriving a dummy cluster further includes:
    updating the centroid coordinates of the first dummy cluster for each first data having a class label that matches the first class label; and
    updating the centroid coordinates of the second dummy cluster for each first data having a class label that matches the second class label.

16. The method of claim 12, further including creating a real cluster in the plurality of clusters if the first data is closest to the dummy cluster.

17. A digital storage medium encoded with a computer program which classifies data, the computer program comprising:
    first instructions for providing first data from a physical process, the first data including a class label associated with attributes of the first data;
    second instructions for deriving an artificial cluster from centroid coordinates of the first data associated with the class label, wherein the artificial cluster has a class label different than the class label associated with the attributes of the first data to cause the first data to separate from the artificial cluster during the classification process;
    third instructions for determining distance measures between the first data and a plurality of clusters which include the artificial cluster;

fourth instructions for creating a real cluster in the plurality of clusters if the first data is closest to the artificial cluster;

fifth instructions for identifying a closest match between second data and the plurality of clusters; and sixth instructions for classifying the second data based on a class label of the closest match from the plurality of clusters.

18. The digital storage medium of claim 17, wherein the second instructions further include:

fifth instructions for creating first and second artificial clusters associated with first and second class labels, respectively;

sixth instructions for initializing the first artificial cluster with the centroid coordinates of the first data if the class label of the first data matches the first class label; and seventh instructions for initializing the second artificial cluster with the centroid coordinates of the first data if the class label of the first data matches the second class label.

19. The digital storage medium of claim 18, wherein the second instructions further include:

eighth instructions for updating the centroid coordinates of the first artificial cluster for each first data having a class label that matches the first class label; and ninth instructions for updating the centroid coordinates of the second artificial cluster for each first data having a class label that matches the second class label.

20. The digital storage medium of claim 17, wherein the second instructions further include creating a real cluster in the plurality of clusters if the first data is closest to a cluster having a class label different then the class label associated with the first data.

* * * * *

UNITED STATES PATENT AND TRADEMARK OFFICE
CERTIFICATE OF CORRECTION

PATENT NO. : 6,907,436 B2
DATED : June 14, 2005
INVENTOR(S) : Nong Ye and Xiangyang Li It is certified that error appears in the above-identified patent and that said Letters Patent is hereby corrected as shown below:

Title page,
Item [73], Assignee, please change "Tempe, AR (US)" to -- Tempe, AZ (US) --.

Column 15,
Line 46, change "tile closest" to -- the closest --.

Signed and Sealed this

Twentieth Day of September, 2005

JON W. DUDAS
*Director of the United States Patent and Trademark Office*